United States Patent
Bray et al.

(10) Patent No.: US 9,889,854 B2
(45) Date of Patent: Feb. 13, 2018

(54) TRANSMISSION ASSEMBLY FOR A SELF-PROPELLED MACHINE, AND MACHINE FITTED WITH SUCH A TRANSMISSION

(71) Applicant: FRANCE REDUCTEURS, Les Herbiers (FR)

(72) Inventors: Sebastien Bray, Les Epesses (FR); Robert Blanchard, Le Boupere (FR)

(73) Assignee: FRANCE REDUCTEURS, Les Herbiers (FR)

( * ) Notice: Subject to any disclaimer, the term of this patent is extended or adjusted under 35 U.S.C. 154(b) by 169 days.

(21) Appl. No.: 14/436,337

(22) PCT Filed: Oct. 1, 2013

(86) PCT No.: PCT/FR2013/052328
§ 371 (c)(1),
(2) Date: Apr. 16, 2015

(87) PCT Pub. No.: WO2014/060675
PCT Pub. Date: Apr. 24, 2014

(65) Prior Publication Data
US 2015/0298703 A1    Oct. 22, 2015

(30) Foreign Application Priority Data

Oct. 18, 2012 (FR) ...................... 12 59918

(51) Int. Cl.
*F16H 61/66* (2006.01)
*B60W 30/19* (2012.01)
(Continued)

(52) U.S. Cl.
CPC ............ *B60W 30/19* (2013.01); *B60K 17/16* (2013.01); *B60W 10/02* (2013.01); *B60W 10/10* (2013.01);
(Continued)

(58) Field of Classification Search
CPC .......................... F16H 2061/661; F16H 63/06
See application file for complete search history.

(56) References Cited

U.S. PATENT DOCUMENTS

| 4,176,560 A * | 12/1979 | Clarke | ............... A01D 34/6806 180/272 |
| 6,364,794 B1 * | 4/2002 | Plamper | ................ B60K 17/08 474/23 |
| 7,641,580 B2 | 1/2010 | Blanchard | |

FOREIGN PATENT DOCUMENTS

| EP | 0 027 513 A1 | 4/1971 |
| FR | 2 892 080 A1 | 4/2007 |

(Continued)

OTHER PUBLICATIONS

International Search Report, dated Dec. 12, 2013, from corresponding PCT application.

*Primary Examiner* — Robert A Siconolfi
*Assistant Examiner* — Ryan Dodd
(74) *Attorney, Agent, or Firm* — Ipsilon USA, LLP

(57) ABSTRACT

A transmission assembly for a self-propelled machine includes a transmission housing fitted with an input shaft and an output shaft, a so-called drive shaft linked to the input shaft by an endless belt transmission and, arranged between the drive shaft and the output shaft, transmission elements including a control mechanism for reversing the rotational drive direction of the output shaft, and a clutch control mechanism, the direction reversing and clutch controls carried by the housing being mounted respectively movable, one between at least three positions: a neutral position, a forward position and a reverse position, the other between at least an engaged position and a disengaged position. The direction reversing control forms, in the neutral position, an element for blocking the clutch control in the disengaged position, and the clutch control forms, in the engaged
(Continued)

position, an element for locking the direction reversing control in the forward or reverse position.

20 Claims, 13 Drawing Sheets

(51) Int. Cl.
| | | |
|---|---|---|
| B60K 17/16 | (2006.01) | |
| F16H 63/30 | (2006.01) | |
| B60W 10/02 | (2006.01) | |
| B60W 10/107 | (2012.01) | |
| B60W 10/18 | (2012.01) | |
| F16H 63/34 | (2006.01) | |
| F16H 63/46 | (2006.01) | |
| F16H 63/48 | (2006.01) | |
| F16H 63/36 | (2006.01) | |
| B60W 10/10 | (2012.01) | |
| F16H 63/06 | (2006.01) | |
| F16H 3/14 | (2006.01) | |
| F16H 61/662 | (2006.01) | |

(52) U.S. Cl.
CPC ........ *B60W 10/107* (2013.01); *B60W 10/182* (2013.01); *F16H 63/302* (2013.01); *F16H 63/3003* (2013.01); *F16H 63/345* (2013.01); *F16H 63/36* (2013.01); *F16H 63/46* (2013.01); *F16H 63/48* (2013.01); *F16H 3/145* (2013.01); *F16H 61/662* (2013.01); *F16H 63/06* (2013.01); *F16H 2061/661* (2013.01); *F16H 2061/6608* (2013.01)

(56) References Cited

FOREIGN PATENT DOCUMENTS

| GB | 677 753 A | 5/1952 |
| GB | 789 165 A | 1/1958 |
| GB | 920 077 A | 3/1963 |

* cited by examiner

TRANSMISSION ASSEMBLY FOR A SELF-PROPELLED MACHINE, AND MACHINE FITTED WITH SUCH A TRANSMISSION

The present invention relates to a transmission assembly for a self-propelled machine, as well as a machine fitted with such a transmission.

It relates more specifically to a transmission assembly that can be positioned between the primary motor shaft and the wheels of said machine, and comprising a transmission housing fitted with an input shaft and an output shaft, such as the main shaft of the wheels of the machine, a drive shaft linked to said input shaft forming the shaft driven by an endless belt drive and, arranged between the input shaft and the output shaft, for transmitting the movement from the input shaft to the output shaft, transmission means including a mechanism for reversing the direction of rotational drive of the output shaft, and a clutch mechanism, each mechanism having a control, said clutch and direction reversing controls being carried on said housing and being mounted respectively and movably in the first case between at least three positions, i.e. a neutral position, a forward position and a reverse position, and in the second case between at least an engaged position and a disengaged position.

The market for small self-propelled machines such as lawn tractors has grown significantly in recent years. Such self-propelled machines usually include a clutch mechanism and a mechanism for reversing the direction of movement of the machine. The clutch mechanism is intended to protect the direction reversing mechanism and in particular to enable the direction of movement of the machine to be reversed without stuttering. This clutch mechanism is essential if the direction reversing device is a non-progressive direction reversing device, for example dog clutches or meshed gears. Machines fitted with such mechanisms are fitted with a driver-actuated clutch control member and a driver-actuated machine movement direction reversing control member, these control members being separate control members. Consequently, the driver is required to act firstly on the direction reversing control if he wishes to reverse the direction of the machine, and secondly on the clutch control member, which is usually associated with the speed variation if he wishes to drive the machine and/or vary the speed of the machine. The presence of two different control members may result, in some cases, in handling errors by the driver if the different control members are actuated in the wrong order. If the self-propelled machine is fitted with a dog-clutch direction reversing device, incorrect handling by the driver will result in violence stuttering when changing direction, and even a risk of braking the transmission.

To avoid such problems, self-propelled machines can nowadays be fitted with progressive direction reversing mechanisms. This increases the cost of such machines. There are also mechanisms for synchronizing the clutch and direction reversing controls, these mechanisms being of complex design and very bulky.

Finally, there are transmission assemblies including an interaction between the brake control and the single speed-variation, clutch and direction-reversing control, as illustrated in document EP0027513 or between the direction reversing control in the reverse position and the speed variator as illustrated in document U.S. Pat. No. 6,364,794 with a view to limiting the speed of the machine in reverse.

One purpose of the present invention is therefore to propose a transmission assembly designed to prevent incorrect handling by the driver, in particular when reversing the direction of movement of the machine, to enable the direction of movement of the machine to be reversed without stuttering and without the risk of breakage.

For this purpose, the invention relates to a transmission assembly for a self-propelled machine that can be positioned between the primary motor shaft and the wheels of said machine, and comprising a transmission housing fitted with an input shaft and an output shaft, such as the main shaft of the wheels of the machine, a drive shaft that can be driven in rotation by the primary motor shaft and is linked to said input shaft forming the shaft driven by an endless belt drive, a clutch mechanism and, arranged between the input shaft and the output shaft for transmitting the movement from the input shaft to the output shaft, transmission means including a mechanism for reversing the direction of rotational drive of the output shaft, the clutch and direction-reversing mechanisms each having a control, said clutch and direction reversing controls being carried on said housing and being mounted respectively and movably the one between at least three positions, i.e. a neutral position, a forward position and a reverse position, and the other one between at least an engaged position and a disengaged position, characterized in that the direction reversing control forms, in the neutral position of said direction reversing control, means for blocking the clutch control in disengaged position that can prevent the clutch control from shifting from the disengaged position to the engaged position, and in that the clutch control forms, when the clutch control is in the engaged position, means for locking the direction reversing control in forward or reverse position that can prevent the direction reversing control from shifting from the forward or reverse position to the neutral position.

The clutch and direction-reversing controls interact with one another. The direction reversing control forms, in the neutral position of said direction reversing control, means for blocking the clutch control in the disengaged position to force the direction reversing control to shift from the neutral position to the forward position or the reverse position before shifting the clutch control from the disengaged position to the engaged position, thereby avoiding any stuttering. Equally, the clutch control forms, in the engaged position of the clutch control, means for locking the direction reversing control in forward position or reverse position to force the clutch control to shift from the engaged position to the disengaged position, before shifting the direction reversing control from the forward position or reverse position to the neutral position, thereby avoiding all risk of stuttering. This design enables an operating mechanism for the clutch and direction-reversing controls to be established. The assembly is made more compact because the controls are carried on the housing.

Preferably, the clutch control and the direction reversing control each include at least one movable part. The or a movable part of the direction reversing control is a controlled part that can be coupled using movement transmission means to an operator-actuated control member to move said control between the neutral, forward and reverse positions, and the or one movable part of the clutch control is a controlled part that can be coupled using movement transmission means to an operator-actuated control member for shifting said clutch control from the disengaged position to the engaged position, and vice versa.

Preferably, the or at least one movable part of the direction reversing control is a rotary part, such as a cam, and the clutch control forms, in engaged position, means for blocking the angular movement of said part.

Preferably, the or at least one movable part of the clutch control is a pivoting lever, and the direction reversing control forms, in neutral position, a stop limiting the angular movement of said lever.

The direction-reversing and clutch controls interact by the housing by mutual bearing contact between said controls, thereby reducing the overall size.

Preferably, the movable parts of the clutch control and of the direction reversing control are provided respectively with a locking member in the first case and two complementary locking members in the second case that are able to cooperate alternately with the locking member of the clutch control, as a function of the forward or reverse position of the direction reversing control.

Generally, the locking member of the clutch control is a male member and the complementary locking members of the direction reversing control are female members.

Preferably, since the or at least one movable part of the clutch control is a pivoting lever that can be coupled using movement transmission means to an operator-actuated control member for shifting said lever from the disengaged position to the engaged position and vice versa, the male locking member is a pad carried on said lever, and since the or at least one movable part of the direction reversing control is a cam that can be coupled using movement transmission means to an operator-actuated control member to move said control between the neutral, forward and reverse positions, the complimentary female locking members of the reversing control are notches formed in the perimeter of the cam, the free space left between two notches forming, in the neutral position of the direction reversing control, the stop limiting the angular movement of said lever.

Preferably, the clutch mechanism is built into the belt drive.

Preferably, the belt drive is a variable-speed transmission and includes two pulleys with variable-gap flanges, the first being carried on the drive shaft, the second being carried on the input shaft and means for opening or closing the flanges of one of the pulleys in relation to one another, the clutch mechanism includes an idle member that is able to cooperate with the movable flange of the controlled drive pulley, this idle member, such as a bearing, roller or mounting, having a surface that is free to rotate about the shaft bearing the controlled pulley and about which the belt is partially wound when the flanges of the drive pulley are in open position such as to prevent any transmission of motion between the pulley-bearing shafts, the movable flange of the controlled drive pulley overlapping said idle member when the flanges of said pulley are being closed together to enable the belt to be wound around the inside of the slot formed by the flanges and to enable the speed variator to shift from a disengaged position to an engaged position, the continued closing of the flanges of the controlled drive pulley enabling the speed to be varied at will, and the means for controlling the opening and closing of the flanges of the drive pulley are at least partially shared with the clutch control.

The transmission assembly also usually includes a mechanism for braking the input shaft and/or the output shaft and/or the transmission means, said braking mechanism being fitted with a brake control carried on said housing, the brake control, mounted movably between at least one position referred to as the first braking position and a non-braking position, being couplable to an operator-actuated brake control member for shifting said brake control from the non-braking position to said first braking position under the action of said operator-actuated brake control member, this brake control having a second braking position distinct from the first braking position, means for returning said brake control to the second braking position, these return means being able, when the direction reversing control is a neutral position, to return the brake control to the second braking position and means for moving the brake control from the second braking position to the non-braking position, these means for moving the brake control being formed at least partially by the active direction reversing control for said brake control, against the return means when shifting said direction reversing control from the neutral position to the forward or reverse position.

This design also helps to make the assembly more compact. Furthermore, this design enables the automatic provision of an active parking brake when the direction reversing control is in neutral position, such that the driver need not actuate such a brake when the direction reversing device is in neutral position. This helps reduce the risk of accidents.

Preferably, the brake mechanism includes a supplementary control, referred to as the additional control, that can be actuated by the operator between an inactive position and an active position, this additional control being able, while same is being activated and while the brake control is in the second braking position, to cooperate with the brake control to shift the brake control from the second braking position to the non-braking position.

The invention also relates to a self-propelled machine comprising a primary motor shaft, wheels and a transmission assembly arranged between the primary motor shaft and the wheels, characterized in that the transmission assembly is as described above.

The invention is detailed in the description below of example embodiments, provided with reference to the attached drawings, in which:

FIG. 3A is a partial perspective view of the reversing mechanism and of the clutch mechanism built into a speed variation mechanism;

Figure 1:
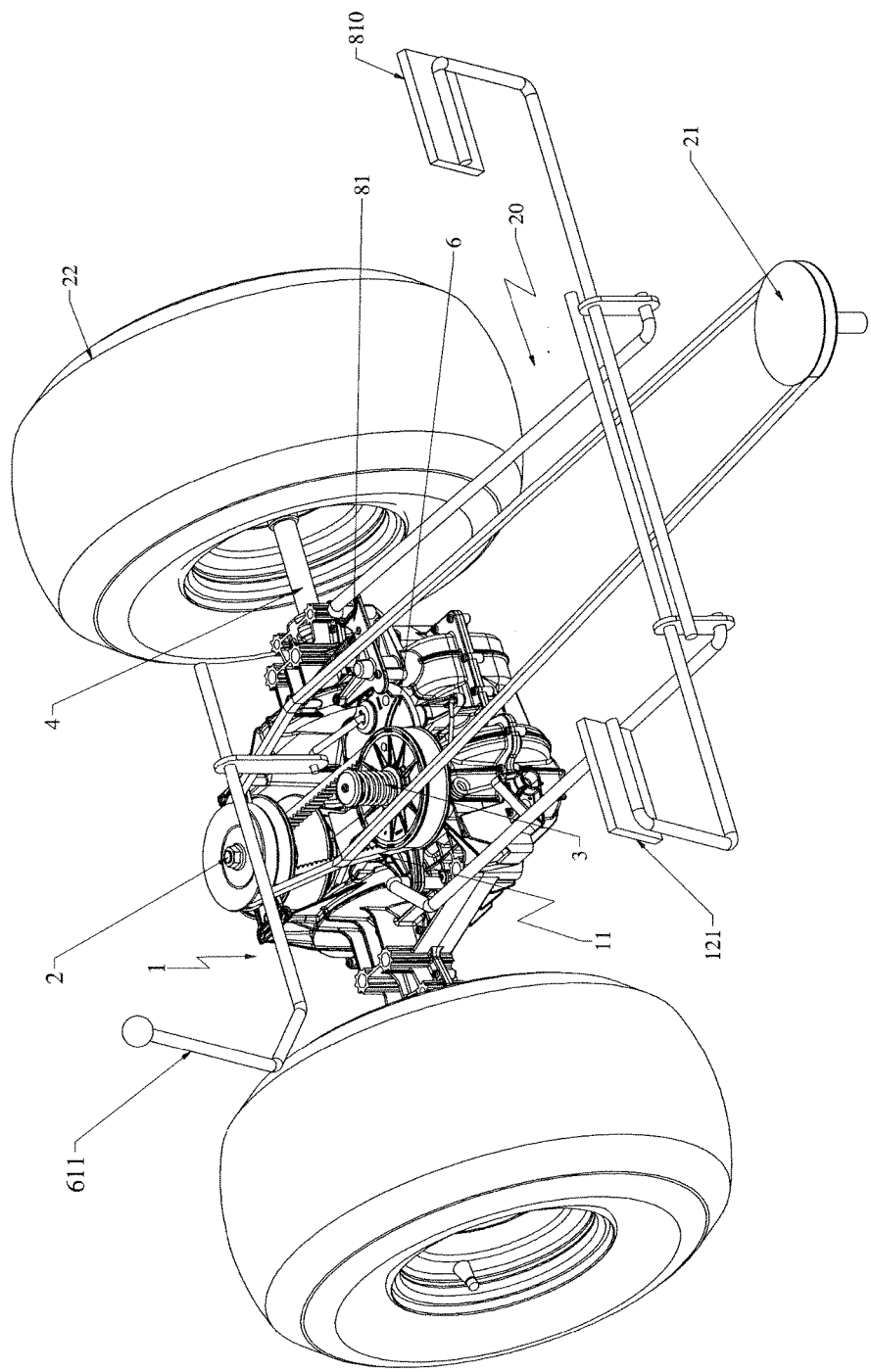
FIG. 1 is a perspective view of a machine fitted with a transmission assembly according to the invention, with the bodywork of the machine omitted.
Figure 2:
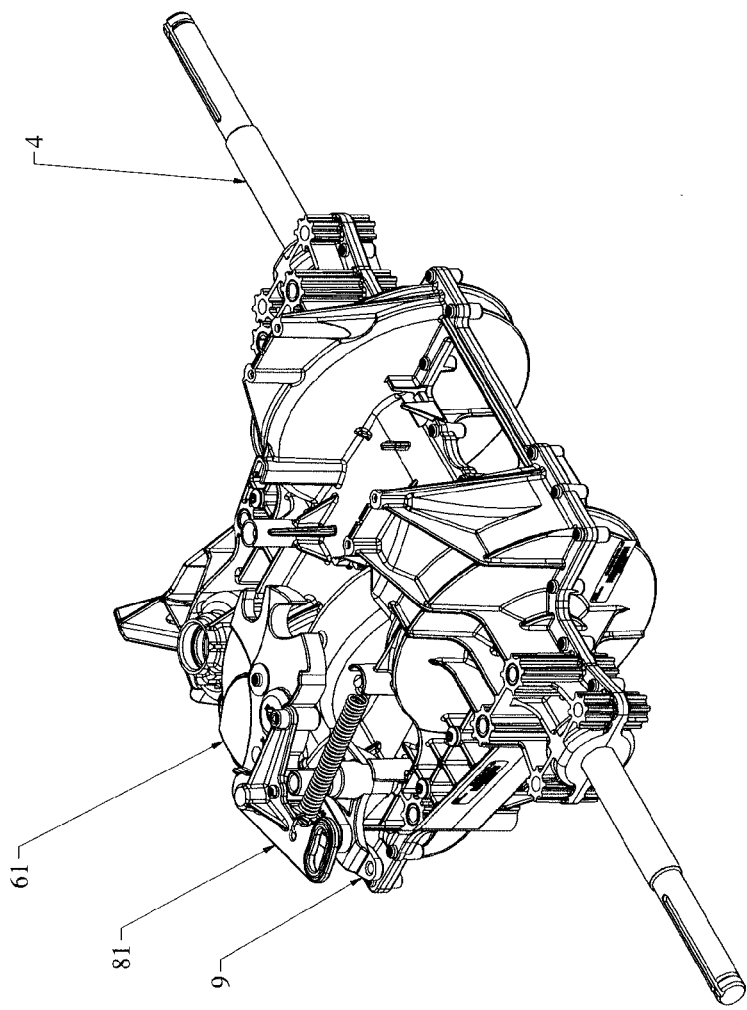
FIG. 2 is a perspective view of a transmission assembly according to the invention.
Figure 3:
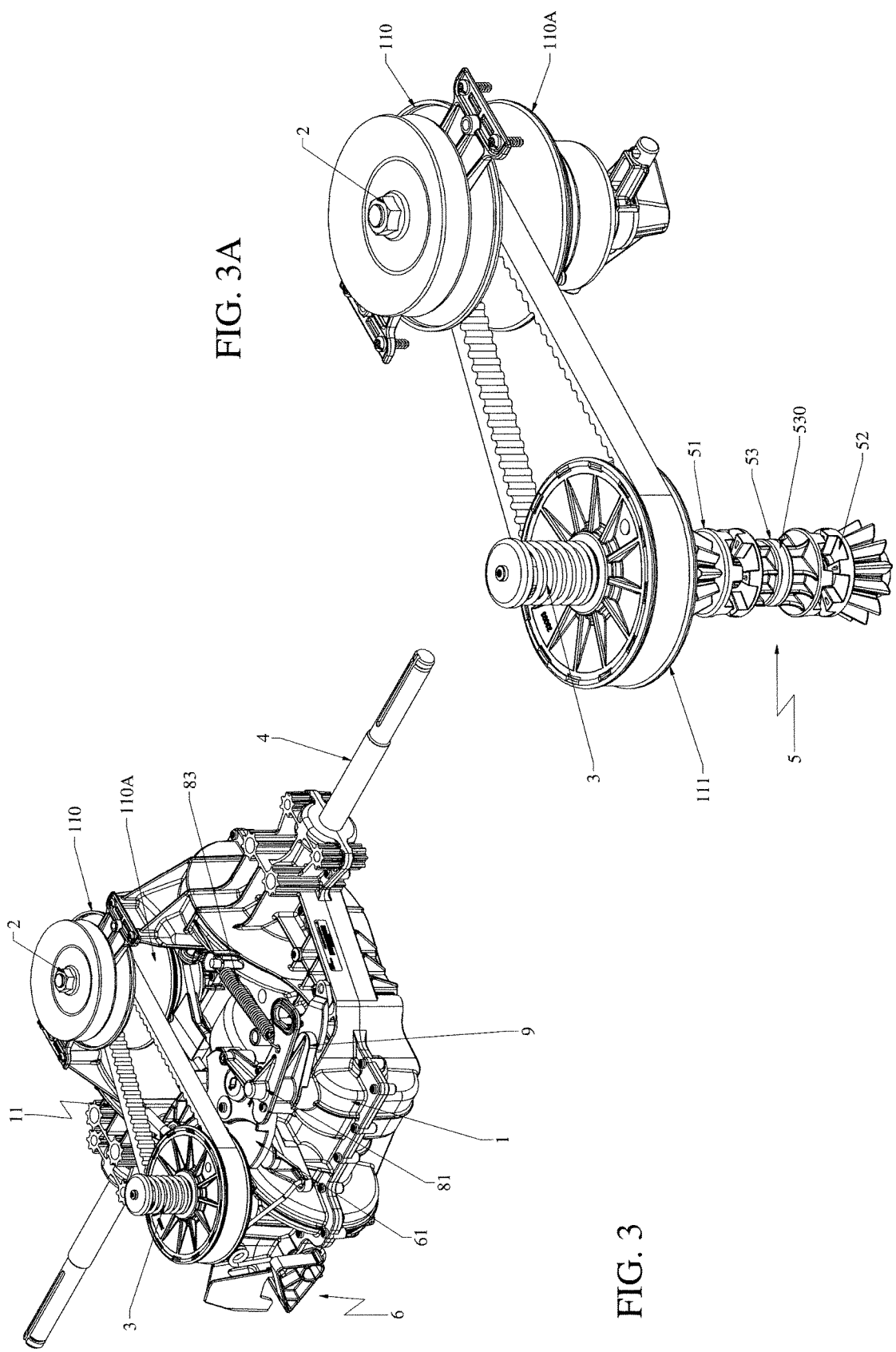
FIG. 3 is a perspective view of a transmission assembly according to the invention taken from another angle.
Figure 4:
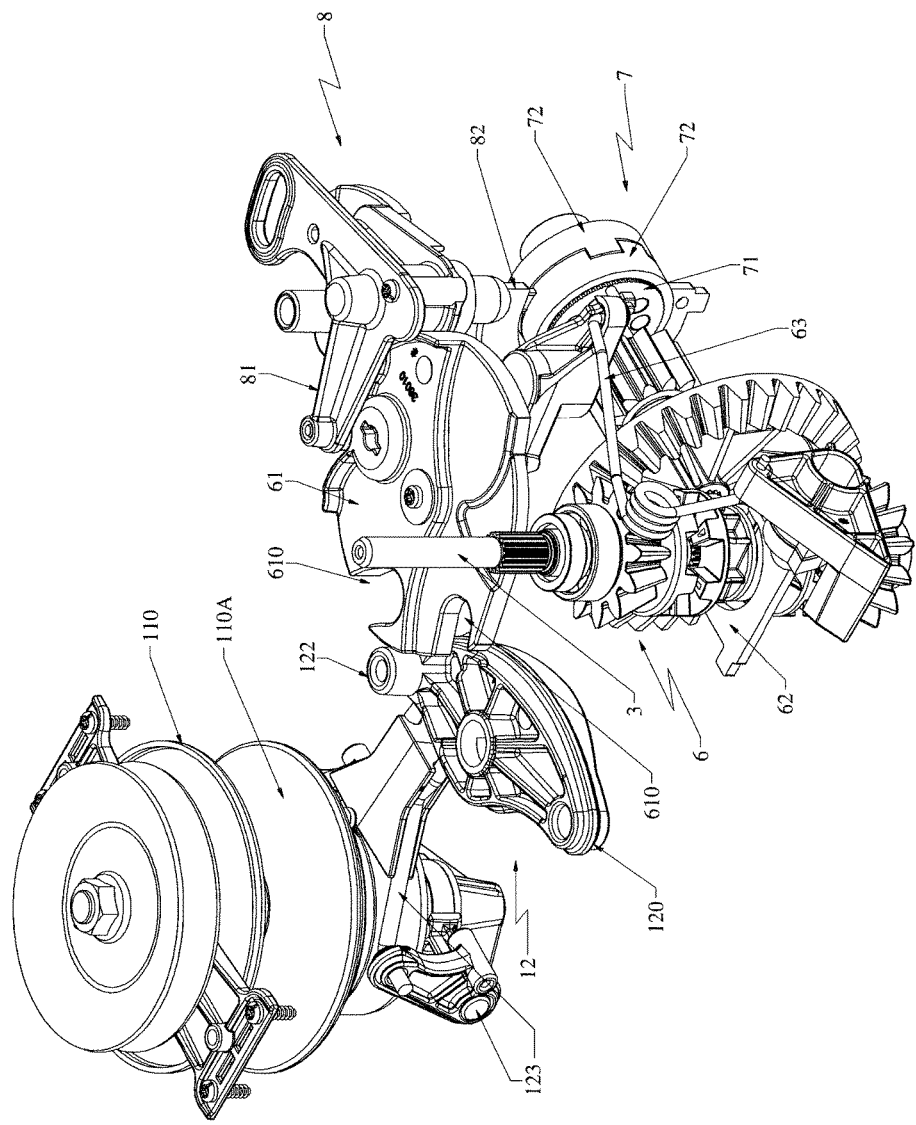
FIG. 4 is a partial perspective view of the clutch and direction reversing controls related to the mechanisms of same.
Figure 5:
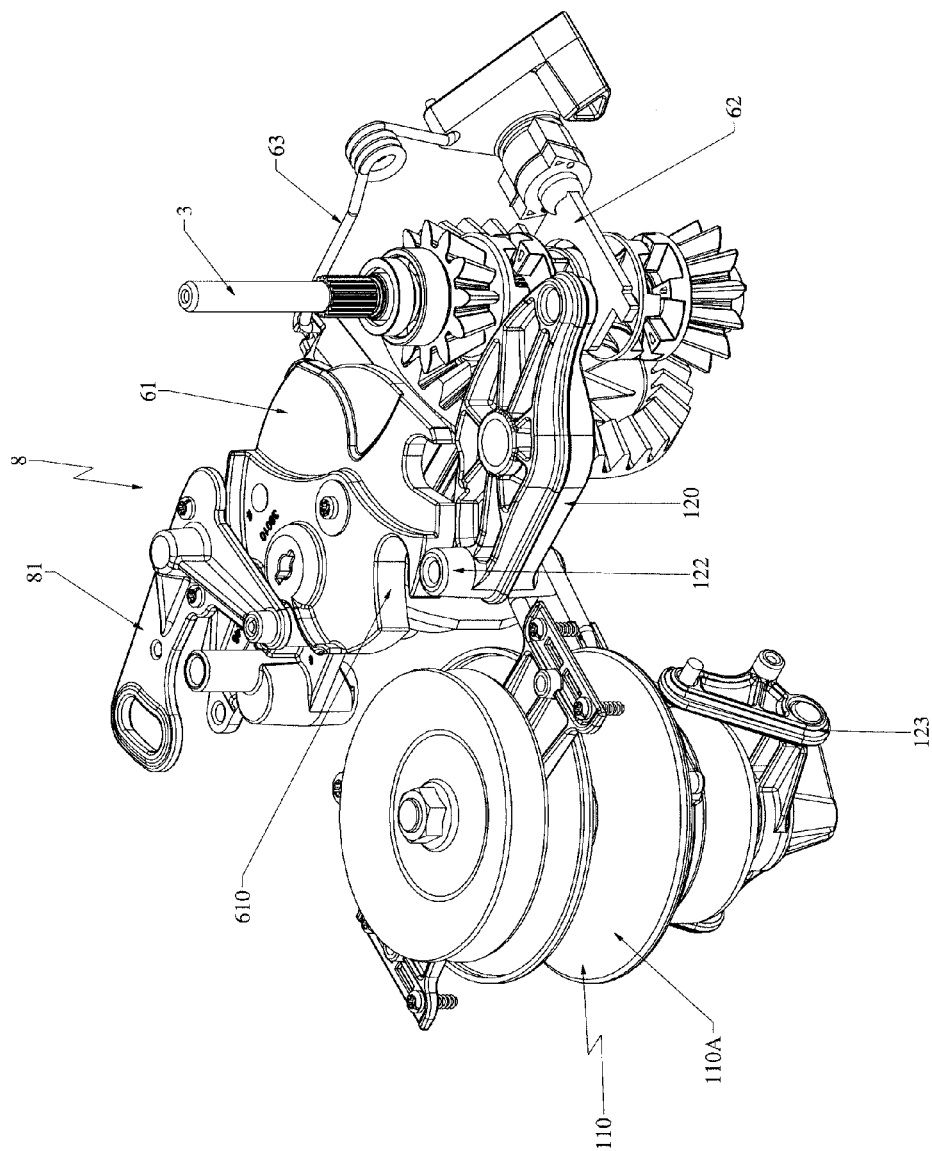
FIG. 5 is a partial perspective view, taken from another angle, of the clutch and direction reversing mechanisms associated with the controls of same.
Figure 6:
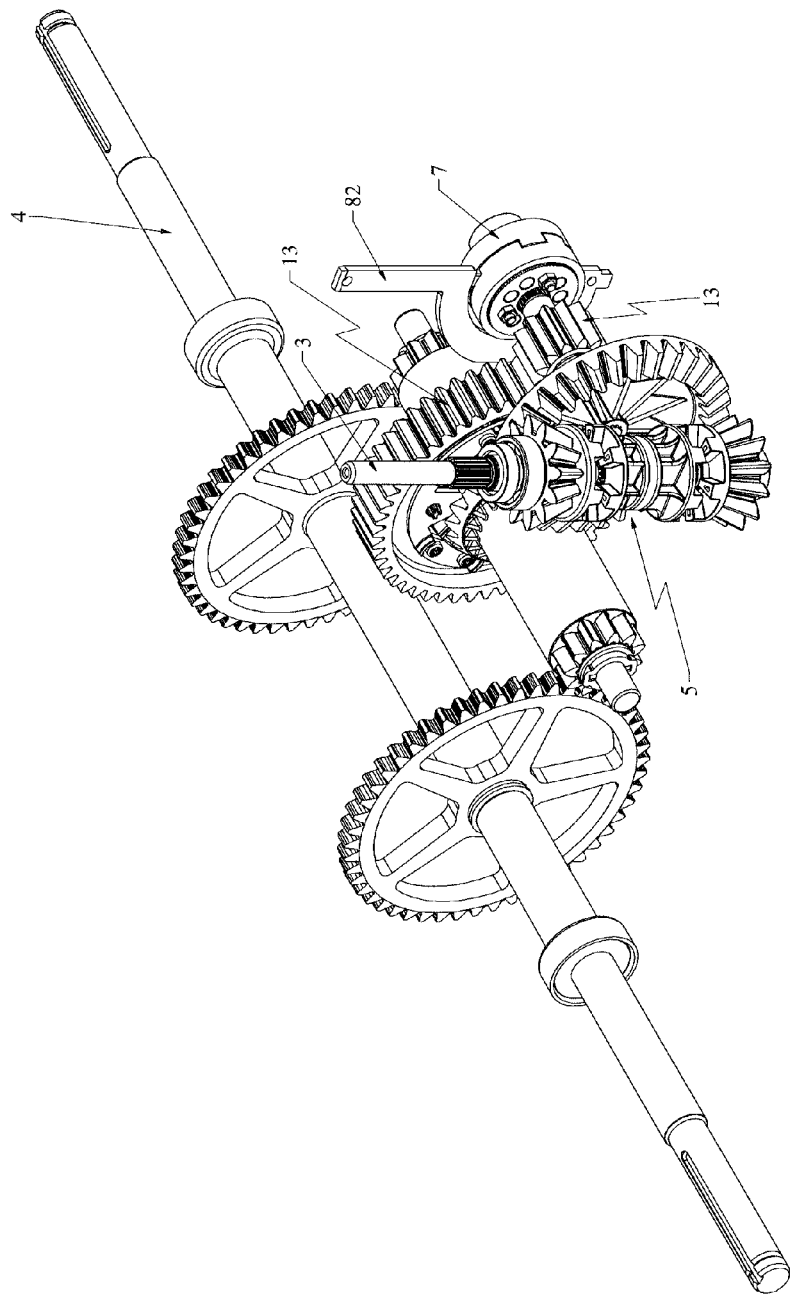
FIG. 6 is a partial perspective view of the means for transmitting movement between the input shaft and the output shaft.
Figure 7B:
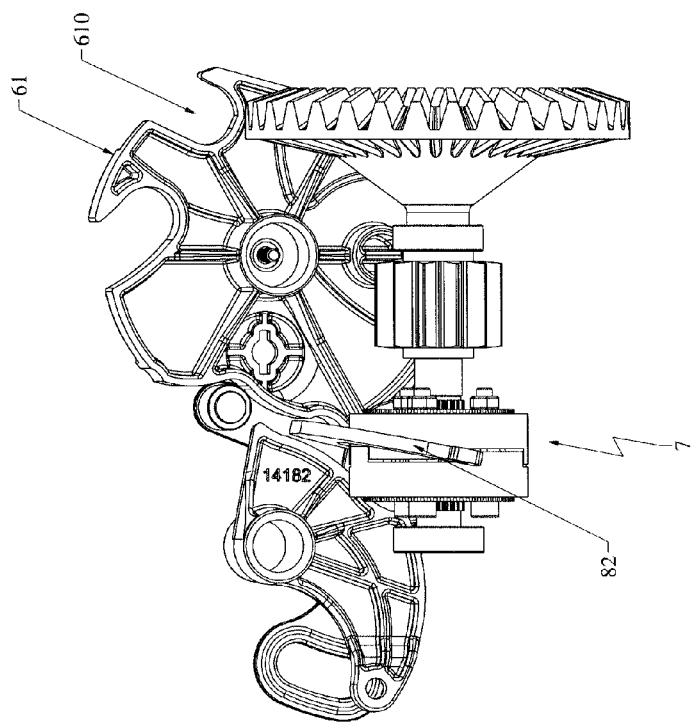
FIGS. 7A and 7B are respectively perspective and worm's-eye views of the direction reversing and brake controls related to the brake mechanisms in the second braking position of the brake control.
Figure 7A:
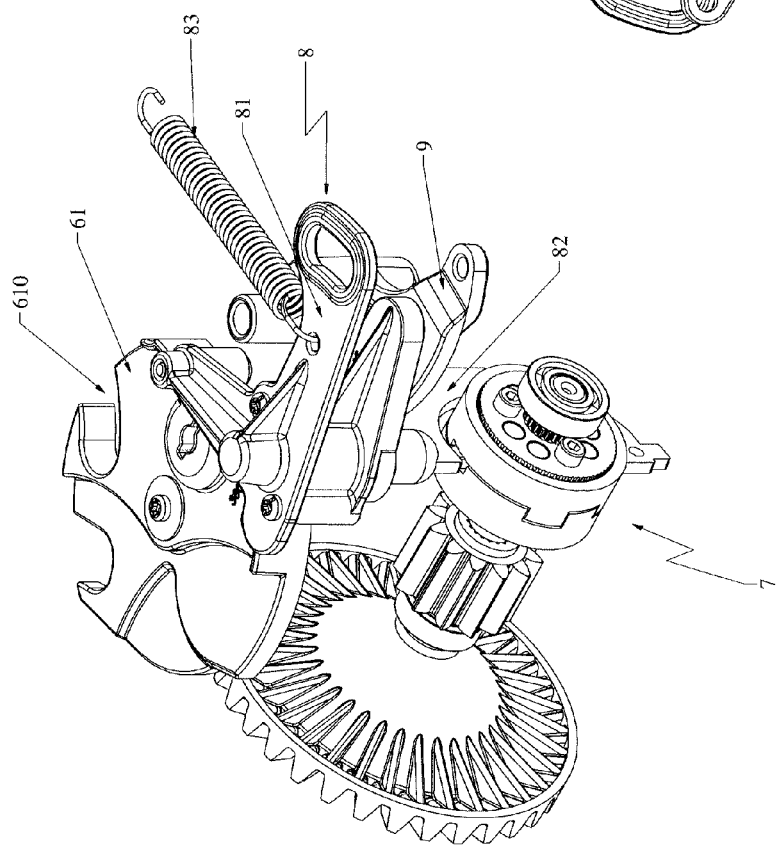
Figure 8B:
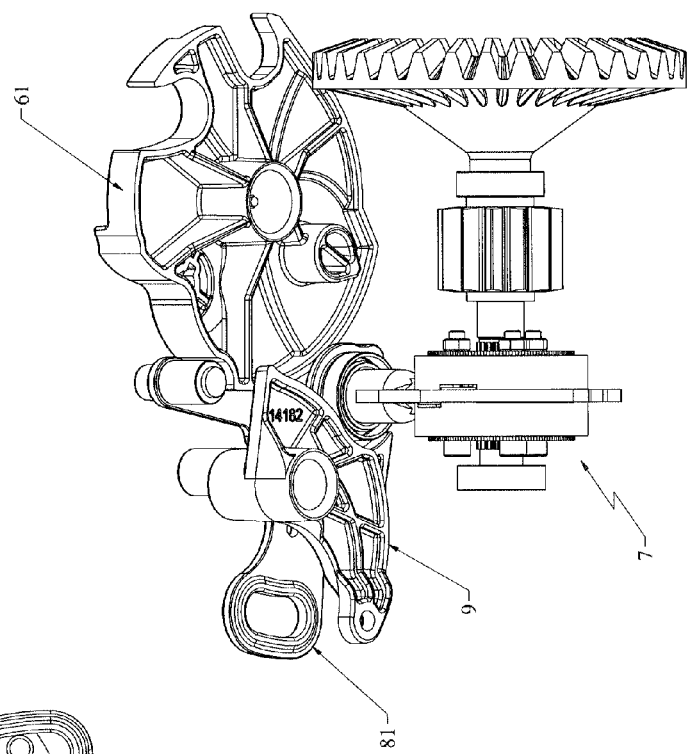
FIGS. 8A and 8B are respectively top and perspective views of the direction reversing and brake controls related to the brake mechanism when the direction reversing control is in forward position and the braking device is in non-braking position.
Figure 8A:
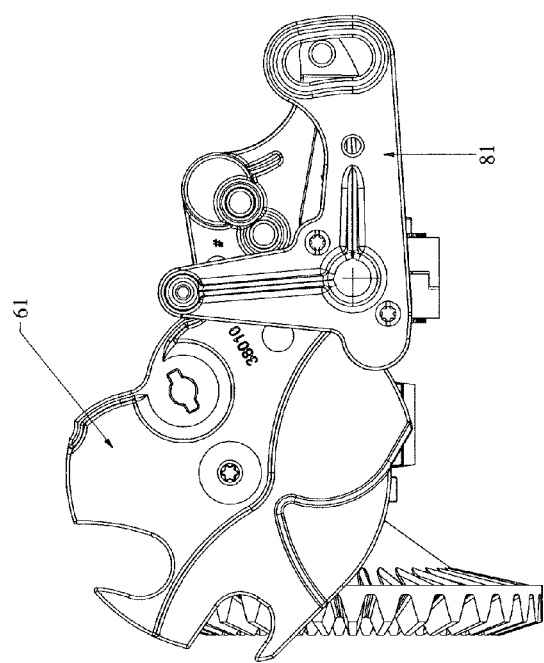
Figure 9B:
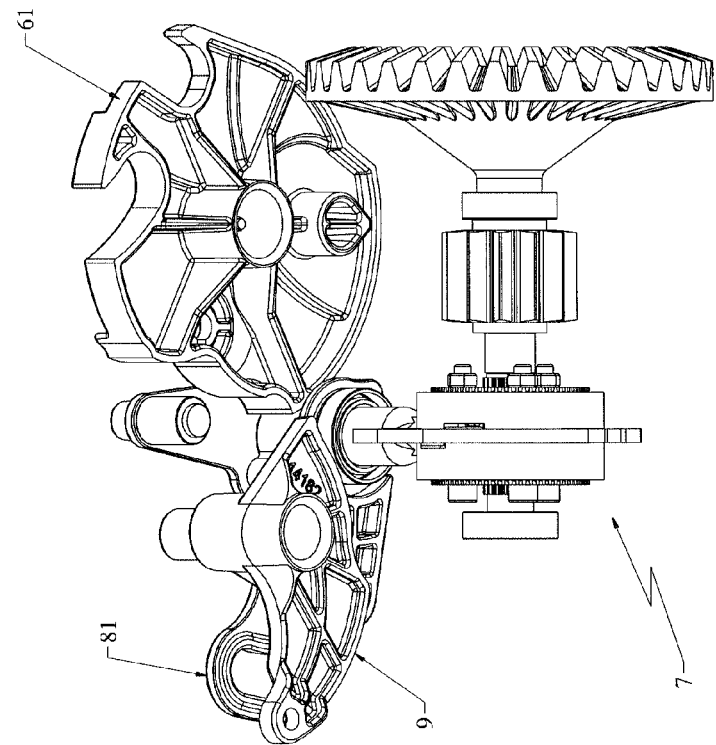
FIGS. 9A and 9B are respectively top and partial perspective views of the brake and direction reversing controls with the additional control in the active position in which the brake control is in the non-braking position.
Figure 9A:
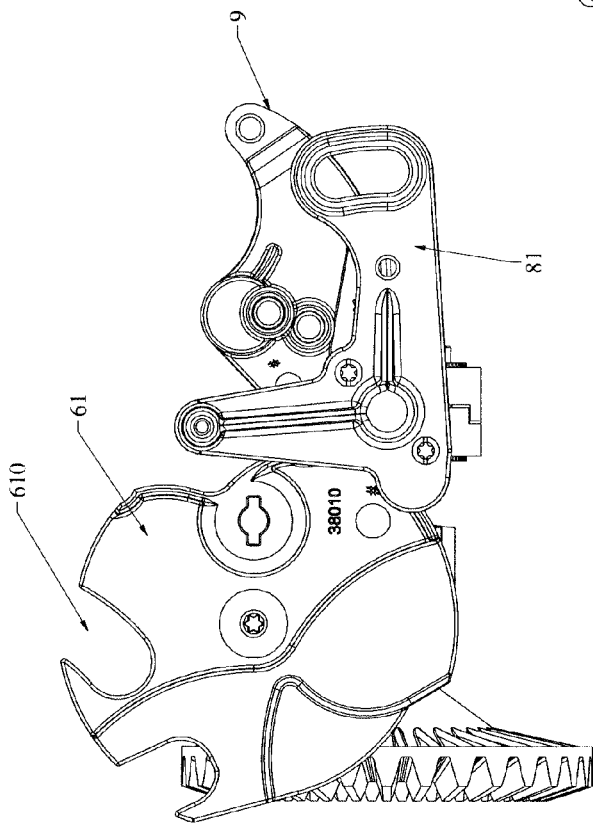
Figure 10A:
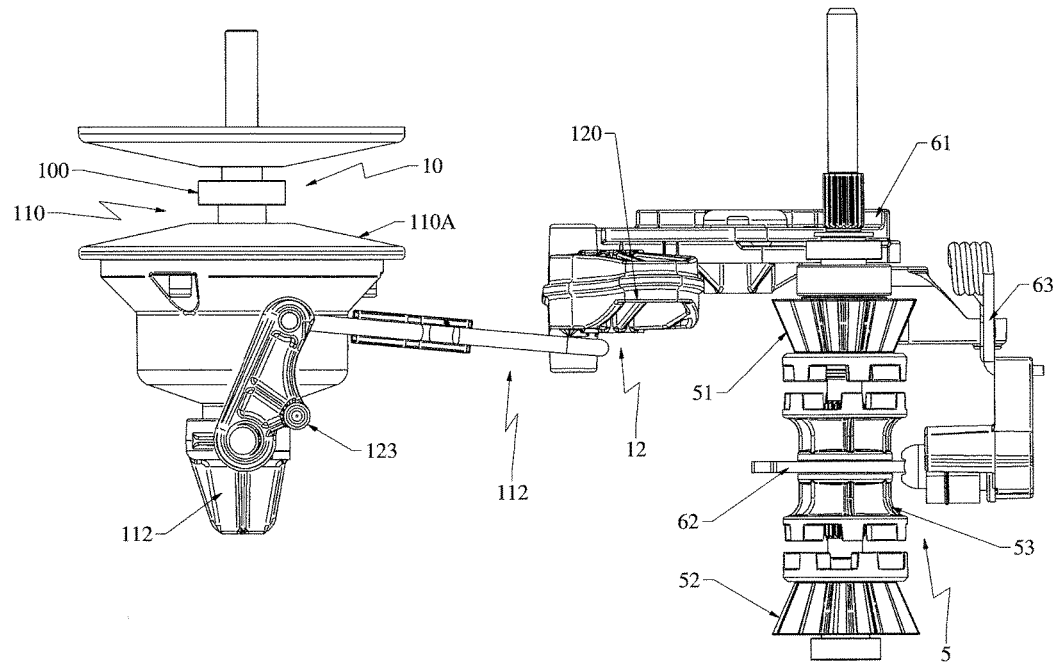
FIGS. 10A and 10B are respectively front and top views of the direction reversing and clutch mechanisms related to the controls of same with the direction reversing control in neutral position and the clutch control in disengaged position.
Figure 10B:
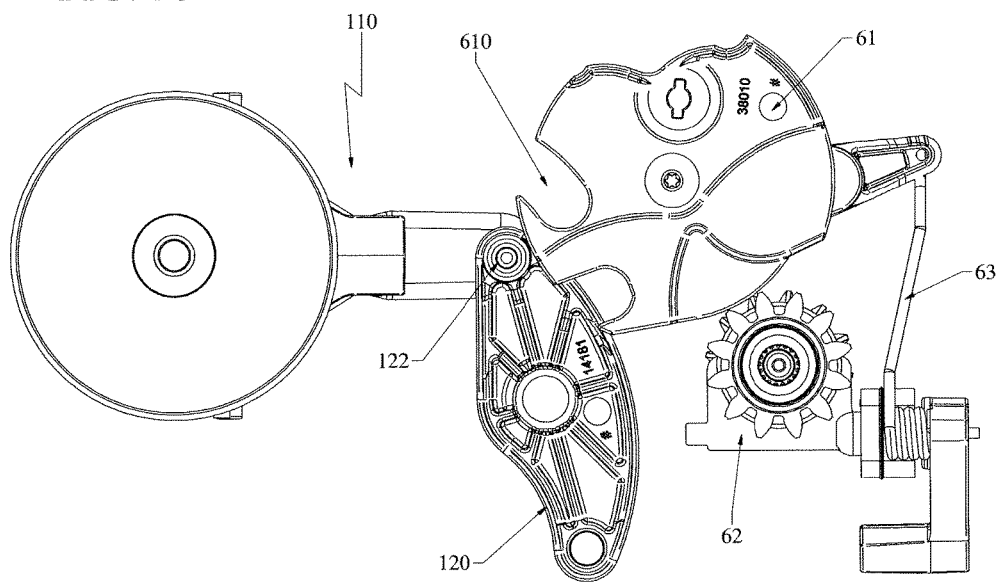
Figure 11A:
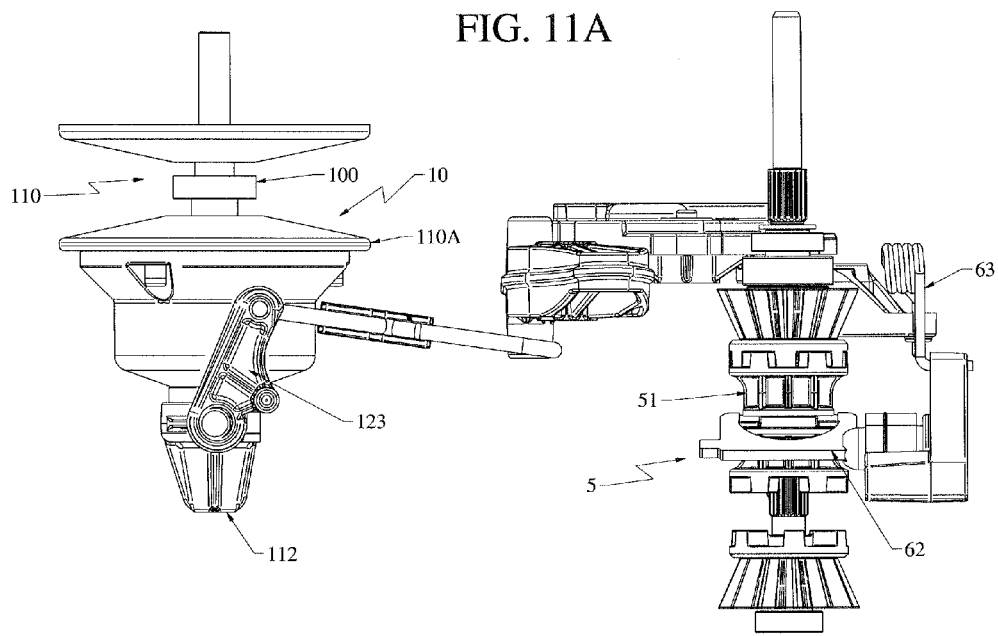
FIGS. 11A and 11B are respectively front and top views of the direction reversing and clutch mechanisms related to the controls of same with the direction reversing control in forward position and the clutch control in disengaged position.
Figure 11B:
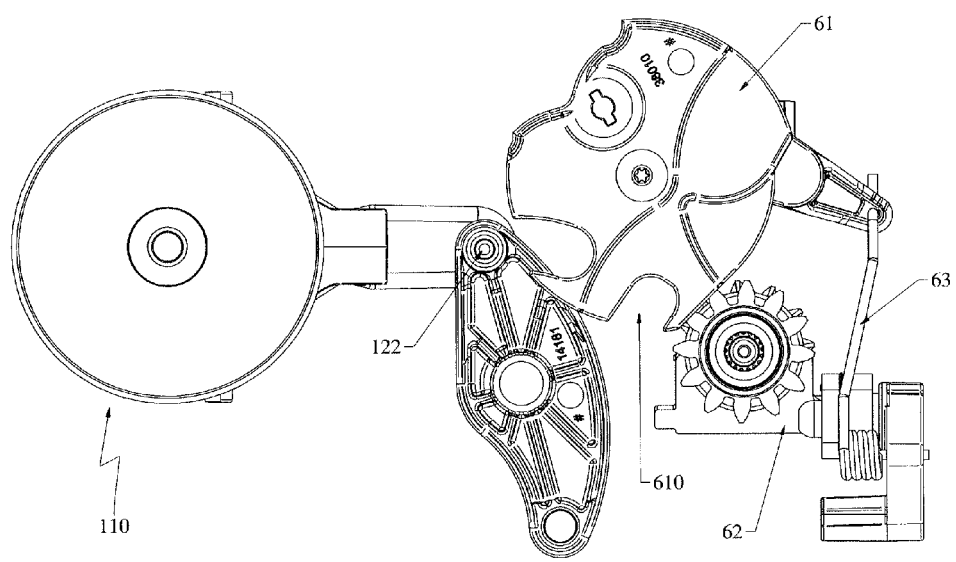
Figure 12A:
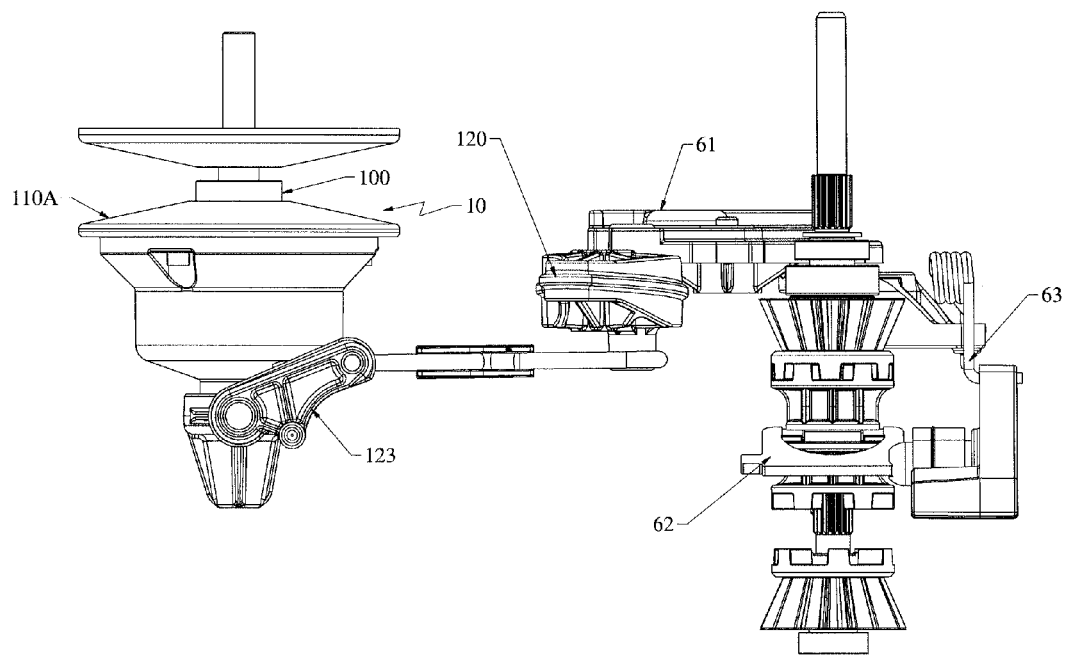
FIGS. 12A and 12B are respectively front and top views of the direction reversing and clutch mechanisms related to the controls of same with the direction reversing control in forward position and the clutch control in engaged position.
Figure 12B:
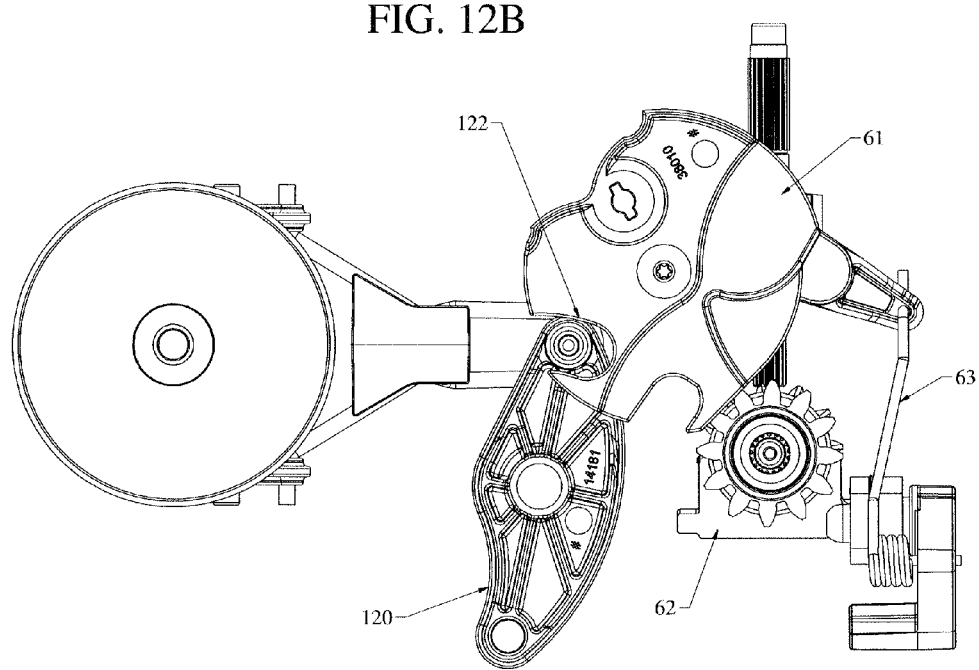
Figure 13A:
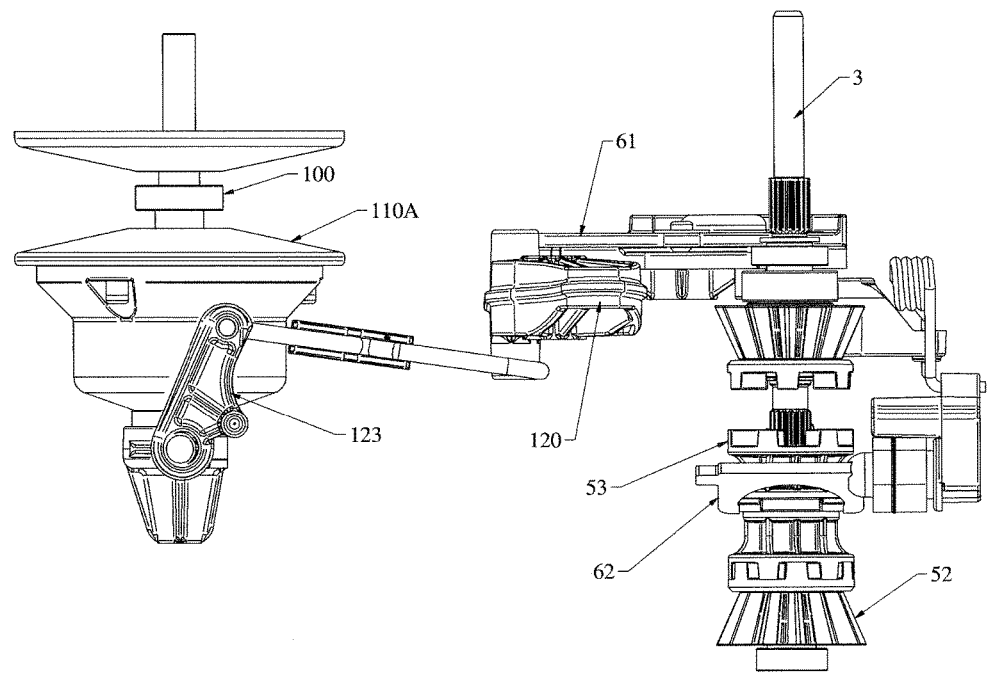
FIGS. 13A and 13B are respectively front and top views of the direction reversing and clutch mechanisms related to the controls of same with the direction reversing control in reverse position and the clutch control in disengaged position.
Figure 13B:
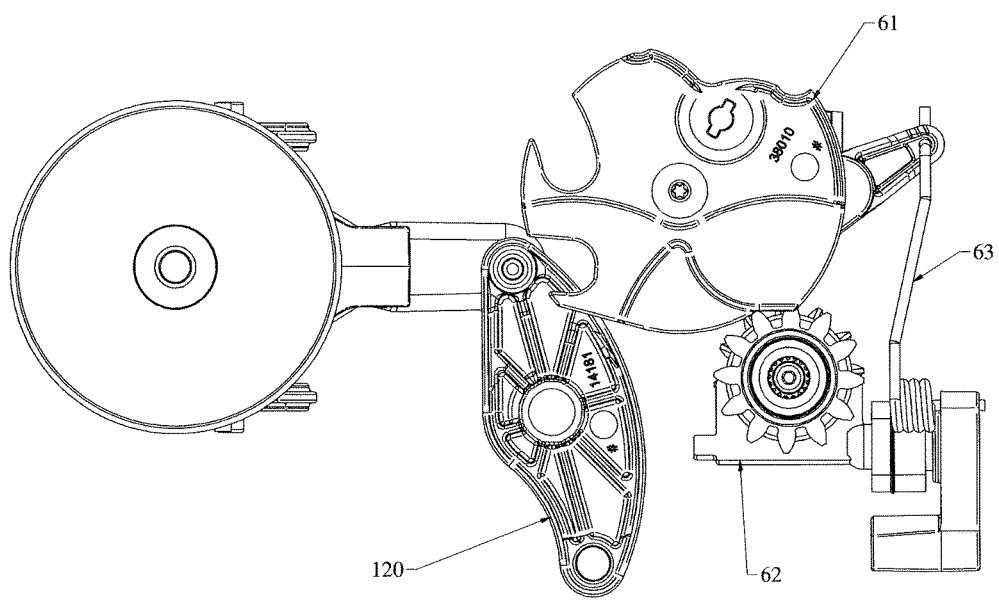

As mentioned above, the transmission assembly to which the invention relates is designed to be installed on a self-propelled machine 20, such as a lawn tractor, fitted with a primary motor shaft 21 and wheels 22.

This assembly includes a transmission housing 1 formed in this case by two half-shells assembled along a joint plane. This transmission housing 1 includes, protruding at least partially from the housing 1, an input shaft 3 and an output shaft 4 that forms, in the examples shown, the main shaft of the wheels of the machine.

The assembly also includes a drive shaft 2 which can be driven in rotation by the primary motor shaft 21 of the machine. This drive shaft 2 may be shared with the primary motor shaft 21 of the machine or be coupled by an endless drive to the primary motor shaft 21 of the machine. It is this second solution which is shown.

The drive shaft 2 is linked to the input shaft 3 by an endless belt drive 11.

The transmission assembly also includes a controlled clutch mechanism 10. This clutch mechanism 10 is built into the belt drive 11.

In the examples shown, the belt drive 11 is a variable-speed belt drive and includes two pulleys 110, 111 with variable-gap flanges. The pulley 110 is carried on the drive shaft 2 while the pulley 111 is carried on the input shaft 3.

The belt drive also includes means 112 for closing or opening the flanges of the pulley, in this case the drive pulley, in relation to one another.

The clutch mechanism 10 includes an idle member 100 designed to cooperate with the moveable flange 110A of the controlled drive pulley 110. This idle member 100 is in this case formed by a bearing having a surface mounted such that it is free to rotate on the shaft 2 bearing the controlled pulley 110 and about which the belt is wound at least partially when the flanges of the controlled drive pulley 110 are in open position, such as to prevent the transmission of movement between the pulley-bearing shafts 2 and 3.

This movable flange 110A of the controlled drive pulley 110 overlaps said idle member 100 when the flanges of said controlled drive pulley 110 are being closed to enable the belts to be wound inside the slot formed by the flanges and to authorize the speed variator to shift from a disengaged position to an engaged position.

The continued closing of the flanges of the controlled drive pulley 110 enables the speed to be varied at will.

The means 112 for controlling the opening and closing of the flanges of the drive pulley 110 are shared with the clutch control 12.

This clutch control 12 (also referred to collectively as clutch control assembly) is carried on the housing and includes a movable part 120, in this case a pivoting lever, that can be coupled using movement transmission means, for example a spring rod, to a control member 121 formed, in the example shown, by an operator-actuated pedal. This pedal can be seen in FIG. 1.

Actuating the pedal 121 enables the clutch control 12, and in particular the movable part 120 of said control, to shift from the disengaged position to the engaged position and vice versa by angular movement. This movable part 120 is coupled using a spring rod to a lever that acts on the movable flange 110A of the controlled drive pulley 110 to move the flange of said pulley towards the upper flange of the pulley to enable the engagement and speed variation described above.

This spring rod and this lever are more specifically visible for example in FIGS. 10A to 12A and are identified using reference sign 123 in the figures.

The controlled movable part 120 of the clutch control formed in this case by a pivoting lever carries a male locking member 122, in the form of a pad in the examples. The role of this locking member 122 is described below.

The transmission assembly also includes a mechanism 5 for reversing the direction of rotational drive of the output shaft 4, controlled by a direction reversing control 6.

The transmission assembly therefore includes, between the primary motor shaft of the machine and the output shaft, at least one controlled-belt speed variator incorporating the controlled clutch mechanism and a mechanism for reversing the direction of movement of the controlled machine, the primary motor shaft transmitting, via the speed variator incorporating the clutch mechanism, the movement of same to the input shaft of the reversing mechanism, which can be engaged directly or indirectly with the output shaft to enable forward or respectively reverse movement of the machine at a variable speed of advancement.

This mechanism 5 for reversing the direction of rotational drive of the output shaft 4 is a dog-clutch mechanism fitted with a direction reversing control 6.

This direction reversing mechanism 5 is carried on the input shaft 3 and includes two dog elements 51, 52, one of which, indicated using reference sign 51 in the figures, being referred to as the forward dog element, and the other, indicated using reference sign 52 in the figures, being referred to as the reverse dog element, and a movable dog 53 interposed between the forward and reverse dog elements 51, 52.

These forward and reverse dog elements 51, 52 are mounted couplably/uncouplably in rotation on the shaft 3 carrying same by means of the dog 53 mounted movably and axially on said shaft 3 using the direction reversing control 6 to occupy a forward position in which the moveable dog 53 is engaged with the forward dog element 51, a reverse position in which the movable dog 53 is engaged with the reverse dog element 52 and a neutral position in which the movable dog 53 is not engaged with either the forward or reverse dog element 51, 52.

In the examples shown, the direction reversing control 6 (also referred to collectively as reversing control assembly) includes a controlled movable part 61 in the form of a cam that can be coupled using movement transmission means, such as a spring rod, to a control member 611, in this case a three-position lever, that can be actuated by hand by the operator to move said direction reversing control 6 between the neutral, forward and reverse positions. This three-position lever is more specifically visible in FIG. 1.

This controlled movable part 61 is provided with two female locking members 610 complementing the male locking member 122 of the clutch control 12. Each female locking member 610 is a notch formed in the perimeter of the cam 61.

The direction reversing control 6 also includes at least one fork 62 coupled using a preferably non-rigid link 63 to the controlled movable part 61 for an angular movement of said fork 62 under the action of the movement of the controlled movable part 61.

The movable dog 53 is in the form of a sleeve constrained to rotate with the shaft 3 on which it is mounted. This sleeve is provided with an external peripheral annular slot 530 and the fork 62 is provided with a tooth that can be inserted into the slot 530 of the sleeve forming the movable dog 53.

The sleeve forming the moveable dog 53 has, at each of the extremities of same, a castellated ring that engages alternately with the dog teeth on the forward and reverse dog elements 51, 52, which each form a conical pinion with said dog teeth on one of the faces of same.

Characteristically of the invention, the direction reversing control (direction reversing control assembly) 6 forms, in neutral position, means for blocking the clutch control (clutch control assembly) 12 in disengaged position, and the clutch control 12 forms, in engaged position, means for locking the direction reversing control 6 in forward or reverse position.

Thus, the cam 61 of the direction reversing control 6 forms, in neutral position, a stop limiting the angular movement of the pivoting lever 120 of the clutch control 12. The stop limiting the angular movement of the lever 120 is formed by the space left free between two notches 610 of the cam 61. The pivoting lever 120 of the clutch cam 12 forms, in engaged position, means for blocking the angular movement of the cam 61.

Indeed, in engaged position, the pad 122 of the lever 120 is seated in a notch 610 of the cam and prevents the cam from moving from the forward or reverse position to the neutral position.

The operator, in this case the driver of the machine, is therefore bound to select the direction of movement of the machine before engaging the clutch, and to disengage the clutch before returning to the neutral position to reverse the direction of the machine.

In the examples shown, the transmission assembly also includes a mechanism 7 for braking the input shaft 3 and/or the output shaft 4 and/or the transmission means. Said brake mechanism 7 is fitted with a brake control 8 mounted on said housing 1. The brake control is mounted movably between at least one position referred to as the first braking position and a non-braking position and can be coupled to the operator-actuated brake control member 810 to shift said brake control 8 from the non-braking position to said first braking position under the action of said operator-actuated brake control member 810. This brake control 8 has a second braking position distinct from the first braking position and means 83 for returning said brake control 8 to the second braking position. These return means 83 are able, when the direction reversing control 6 is in neutral position, to return the brake control 8 to the second braking position. The brake mechanism 7 also includes means for moving the brake control 8 from the second braking position to the non-braking position, these means for moving the brake control 8 being at least partially formed by the direction reversing control 6 active against the return means 83 when said direction reversing control 6 is shifted from the neutral position to the forward position or reverse position.

The brake mechanism 7 mounted on the input shaft or the output shaft or the shaft of the transmission means between the input shaft and the output shaft, as is the case in the examples shown, includes at least one pair of substantially coaxial parts with conical surfaces that can be slid onto said shaft, the first or external cone being mounted such that it is constrained to rotate with said shaft, and the second or internal cone being mounted non-rotatably in relation to said shaft.

The internal cone 72 is in the form of a wheel with a conical axial bore and the external cone 71 preferably has an overall truncated cone shape and has a central recess to enable it to be slid onto said body.

The brake control 8 is able to cause a relative axial movement of the cones 71, 72 to bring them closer together or further apart. The external cone 71 is, in the closed position of said cones corresponding to the braking position, seated inside the axial bore of the internal cone 72, with the external conical peripheral surface of same engaged by bearing contact with the conical seat of the internal cone 72.

In the examples shown, the brake mechanism 7 includes two pairs of cones each formed by an external cone and an internal cone, and the brake control 8 is common to both pairs of cones.

This brake control 8 includes a controlled movable part that can be coupled using movement transmission means to the operator-actuated brake control member 810, in this case formed by a pedal. This controlled part 81 is in the form of a pivoting lever 81 fitted with means 83, such as a return spring, in a position bearing against the external profile of the cam 61 forming the controlled movable part of the direction reversing control 6.

The pivoting lever 81 and the cam 61 are mounted in rotation about parallel axes.

The brake control 8 also includes a two-pronged fork 82 coupled to and constrained to rotate with the controlled movable part 81, each prong of the fork 82 having an internal radial tooth forming the active part of the fork that can be positioned close to at least one of said cones 71, 72 to move said cones 71, 72 closer together.

In the examples shown, the internal cones are interposed between the external cones and are moved by the fork arranged between said internal cones. The external cones are held apart and together define a gap of a fixed maximum length inside which the internal cones are seated, the fork forming a separator interposed between the internal cones. The external cones are joined together by means of parallel rods along which the external cones slide towards and away from one another, the extremities of each rod having an axial stop constituting means for holding the cones apart.

The internal cones are moved axially and immobilized in rotation by the shared fork. The wheels forming the internal cones have, on the opposite faces of same, teeth forming a castellated ring. The teeth in said castellated ring interpenetrate one another and together form a space for receiving a portion of the shared fork, referred to as the active control portion.

Each prong of the fork has an internal radial tooth forming the active control portion.

Such brake mechanisms operate as follows:

It is assumed that the direction reversing control is in neutral position. The pivoting brake-control lever 81 is pushed back by the spring 83 against the external profile of the direction reversing control cam 61, which occupies a neutral position, into a position corresponding to a braking position, referred to as the second braking position. In this second braking position, the brake mechanism acts as the equivalent of a parking brake.

When the direction reversing cam is controlled following a forward or reverse control of the machine by the driver, the pivoting brake-control lever 81 is pushed back by bearing contact of the cam on the lever 81 to the non-braking position.

If the driver of the machine needs to brake, he simply needs to actuate the brake pedal, which drives the brake control from the non-braking position to the first braking position.

When the driver releases the brake pedal, the brake control returns to the non-braking position or to the second braking position if the direction reversing cam has returned to the neutral position.

The brake mechanism 7 includes a supplementary control 9, referred to as the additional control, that can be actuated by the operator between an inactive position and an active position, this additional control 9 being able, while same is being activated and while the brake control 8 is in the second braking position, to cooperate with the brake control 8 to shift the brake control 8 from the second braking position to the non-braking position.

Indeed, if the driving position of the machine is no longer accessible, it is no longer possible to move the machine by pushing. An additional control is provided to overcome this drawback. The brake control 8 is arranged at least partially on the path followed by the additional control 9 during activation of same to enable the brake control 8, in parallel with activation of the additional control 9, to be shifted from the second braking position to the non-braking position by simple bearing contact.

In the examples shown, the additional control 9 includes a part, in this case a pivoting lever, mounted movably between an inactive position and an active position that can be coupled to an elongated pushrod movement transmission member actuated by the operator and positioned on the outside of the machine, usually behind the machine, for shifting said part comprising a pivoting lever from one position to another.

At least one portion of the additional control 9 formed by the pivoting lever is provided with a pad that bears against the pivoting lever of the brake control 8 during activation of the additional control 9 to constrain the pivoting lever 81 of the brake control 8 to shift from the second braking position to the non-braking position by simple bearing contact.

The transmission assembly works as follows: It is assumed that the speed-variation and clutch pedal is in the disengaged position, that the direction reversing lever is in the neutral position and that the brake mechanism control is in the second braking position, the brake pedal not being actuated.

The driver cannot actuate the speed-variation and clutch lever on account of the cooperation between the direction-reversing and clutch controls. He is therefore bound to actuate the direction reversing lever to shift into forward or reverse. This moves the brake control into the non-braking position and enables the clutch control to be actuated.

The driver then actuates the speed-variation and clutch pedal. This locks the direction reversing control in the forward or reverse position selected.

If he wants to reverse while in forward operating mode, the driver is required to release the speed-variation and clutch pedal, which makes it possible to unlock the direction reversing control, actuate the direction reversing lever to move it to the neutral position, then to engage reverse gear. He can then re-engage the clutch and vary the speed.

If at any point during the forward or reverse movement of the machine he wishes to brake, he need only actuate the brake pedal to move the brake control to the first braking position.

The invention claimed is:

1. A transmission assembly for a self-propelled machine positioned between a primary motor shaft and wheels of said machine comprises:

a transmission housing fitted with an input shaft and an output shaft that is a main shaft of the wheels of the machine, a drive shaft driven in rotation by the primary motor shaft and is linked to said input shaft forming a driven shaft driven by an endless belt drive, a clutch mechanism and, arranged between the input shaft and the output shaft for transmitting the movement from the input shaft to the output shaft, a transmission including a mechanism for reversing the direction of rotational drive of the output shaft, the clutch and direction-reversing mechanisms each having control assemblies, said clutch and direction reversing control assemblies being carried on said housing and being mounted respectively and movably, the direction reversing control assembly between at least three positions, i.e. a neutral position, a forward position and a reverse position, and the clutch control assembly between at least an engaged position and a disengaged position, wherein the direction reversing control assembly, when said direction reversing control assembly is in neutral position, blocks the clutch control assembly in disengaged position that prevents the clutch control assembly from shifting from the disengaged position to the engaged position, and the clutch control assembly, when the clutch control assembly is in engaged position, locks the direction reversing control assembly in the forward or reverse position, that prevents the direction reversing control assembly from shifting from the forward or reverse position into the neutral position.

2. The transmission assembly as claimed in claim 1, wherein the clutch control assembly and the direction reversing control assembly each include at least one movable part.

3. The transmission assembly as claimed in claim 2, wherein the at least one movable part of the direction reversing control assembly is a rotary part that is a cam, and the clutch control assembly, in engaged position, blocks the angular movement of said part.

4. The transmission assembly as claimed in claim 2, wherein the at least one movable part of the clutch control assembly is a pivoting lever, and in that the direction reversing control assembly, in neutral position, is a stop, limiting the angular movement of said lever.

5. The transmission assembly as claimed in claim 2, wherein the one movable part of the direction reversing control assembly is a controlled part that is coupled using movement transmission means to an operator-actuated control member to move said direction reversing control assembly between the neutral, forward and reverse positions, and the or one movable part of the clutch control assembly is a controlled part that is coupled using movement transmission means to an operator-actuated control member for shifting said clutch control assembly from the disengaged position to the engaged position, and vice versa.

6. The transmission assembly as claimed in claim 2, wherein the movable parts of the clutch controller and of the direction reversing controller are provided respectively with a locking member in the clutch controller and two complementary locking members in the direction reversing controller that cooperate alternately with the locking member of the clutch controller, as a function of the forward or reverse position of the direction reversing control assembly.

7. The transmission assembly as claimed in claim 6, wherein the locking member of the clutch control assembly is a male member and the complementary locking members of the direction reversing control assembly are female members.

8. The transmission assembly as claimed in claim 6, wherein since the at least one movable part of the clutch controller is a pivoting lever coupled, using movement transmission, to an operator-actuated control member for shifting said lever from the disengaged position to the engaged position and vice versa, the male locking member is a pad carried on said lever, and since the or at least one movable part of the direction reversing control assembly is a cam coupled, using movement transmission, to an operator-actuated control member to move said control between the neutral, forward and reverse positions, the complimentary female locking members of the direction reversing control assembly are notches formed in the perimeter of the cam, free space left between two notches forming, in the neutral position of the direction reversing control assembly, a stop limiting the angular movement of said lever.

9. The transmission assembly as claimed in claim 1, wherein the clutch mechanism is built into a belt drive.

10. The transmission assembly as claimed in claim 9, wherein the belt drive is a variable-speed transmission and includes two pulleys with variable-gap flanges, the first pulley being carried on the drive shaft, the second pulley being carried on the input shaft and means for opening or closing the flanges of one of the pulleys in relation to one another, the clutch mechanism includes an idle member that cooperates with the movable flange of the controlled drive pulley, this idle member being a bearing, roller or mounting, having a surface that is free to rotate about the shaft bearing the controlled pulley and about which the belt is partially wound when the flanges of the drive pulley are in open position preventing any transmission of motion between the pulley-bearing shafts, a movable flange of the controlled pulley overlapping said idle member when the flanges of said pulley are being closed together, winding the belt around the inside of a slot formed by the flanges and enabling a speed variator to shift from a disengaged position to an engaged position, the continued closing of the flanges of the controlled drive pulley enabling the speed to be varied at will, and the means for controlling the opening and closing of the flanges of the drive pulley are at least partially shared with the clutch control assembly.

11. The transmission assembly as claimed in claim 1, wherein the transmission assembly also includes a mechanism for braking the input shaft and/or the output shaft and/or the transmission, said braking mechanism being fitted with a brake controller carried on said housing, the brake controller, mounted movably between at least one position referred to as the first braking position and a non-braking position, being couplable to an operator-actuated brake control member for shifting said brake controller from the non-braking position to said first braking position under the action of said operator-actuated brake control member, this brake controller having a second braking position distinct from the first braking position, means for returning said brake controller to the second braking position, these return means, when the direction reversing control assembly is in neutral position, returning the brake controller to the second braking position and means for moving the brake controller from the second braking position to the non-braking position, these means moving the brake controller, being formed at least partially by the direction reversing control assembly active on said brake controller, against the return means when shifting said direction reversing control assembly from the neutral position to the forward or reverse position.

12. The transmission assembly as claimed in claim 11, wherein the brake mechanism includes a supplementary controller, referred to as the additional control, that is actuated by the operator between an inactive position and an active position, this additional controller being able, while said additional controller is being activated and while the brake controller is in the second braking position, to cooperate with the brake controller to shift the brake controller from the second braking position to the non-braking position.

13. Self-propelled machine with a primary motor shaft, wheels and a transmission assembly arranged between the primary motor shaft and the wheels, wherein the transmission assembly is as claimed in claim 1.

14. The transmission assembly as claimed in claim 3, wherein the at least one movable part of the clutch control assembly is a pivoting lever, and the direction reversing control assembly forms, in neutral position, a stop limiting the angular movement of said lever.

15. The transmission assembly as claimed in claim 3, wherein the one movable part of the direction reversing control assembly is a controlled part that is coupled using movement transmission means to an operator-actuated control member to move said control between the neutral, forward and reverse positions, and the or one movable part of the clutch control assembly is a controlled part that can be coupled using movement transmission means to an operator-actuated control member for shifting said clutch control assembly from the disengaged position to the engaged position, and vice versa.

16. The transmission assembly as claimed in claim 4, wherein the one movable part of the direction reversing control assembly is a controlled part that can be coupled using movement transmission means to an operator-actuated control member to move said control between the neutral, forward and reverse positions, and the or one movable part of the clutch control assembly is a controlled part that is coupled, using movement transmission, to an operator-actuated control member for shifting said clutch control assembly from the disengaged position to the engaged position, and vice versa.

17. The transmission assembly as claimed in claim 3, wherein the movable parts of the clutch control assembly and of the direction reversing control assembly are provided respectively with a locking member in the clutch control assembly and two complementary locking members in the direction reversing control assembly that cooperate alternately with the locking member of the clutch control assembly, as a function of the forward or reverse position of the direction reversing control assembly.

18. The transmission assembly as claimed in claim 4, wherein the movable parts of the clutch control assembly and of the direction reversing control assembly are provided respectively with a locking member in the clutch control assembly and two complementary locking members in the direction reversing control assembly that cooperate alternately with the locking member of the clutch control assembly, as a function of the forward or reverse position of the direction reversing control assembly.

19. The transmission assembly as claimed in claim 5, wherein the movable parts of the clutch control assembly and of the direction reversing control assembly are provided respectively with a locking member in the clutch control assembly and two complementary locking members in the direction reversing control assembly that to cooperate alternately with the locking member of the clutch control assembly, as a function of the forward or reverse position of the direction reversing control assembly.

20. The transmission assembly as claimed in claim 7, wherein since the at least one movable part of the clutch control assembly is a pivoting lever that is coupled, using movement transmission, to an operator-actuated control member for shifting said lever from the disengaged position to the engaged position and vice versa, the male locking member is a pad carried on said lever, and since the or at least one movable part of the direction reversing control assembly is a cam coupled, using movement transmission, to an operator-actuated control member to move said control between the neutral, forward and reverse positions, the complimentary female locking members of the reversing control assembly are notches formed in the perimeter of the cam, free space left between two notches forming, in the neutral position of the direction reversing control assembly, a stop limiting the angular movement of said lever.

\* \* \* \* \*